Nov. 12, 1929.   A. D. WILLIAMS ET AL   1,735,192
SUPPORT FOR PIPES, RODS, AND THE LIKE
Filed Sept. 4, 1928
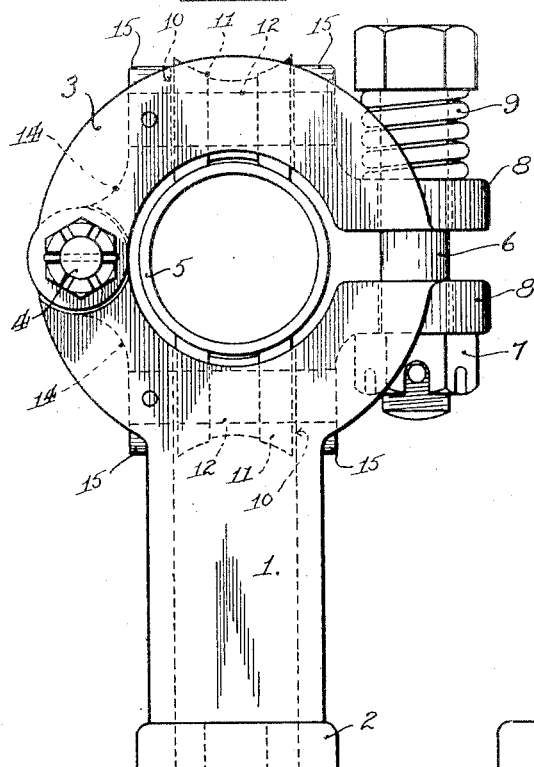
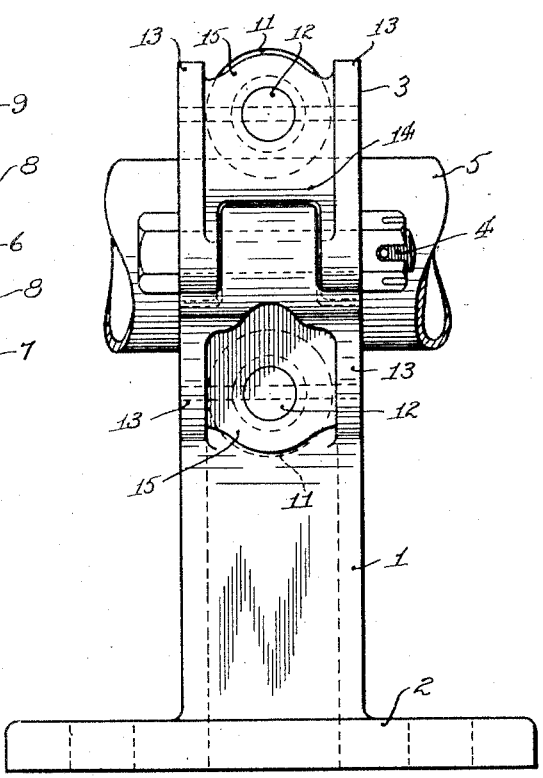
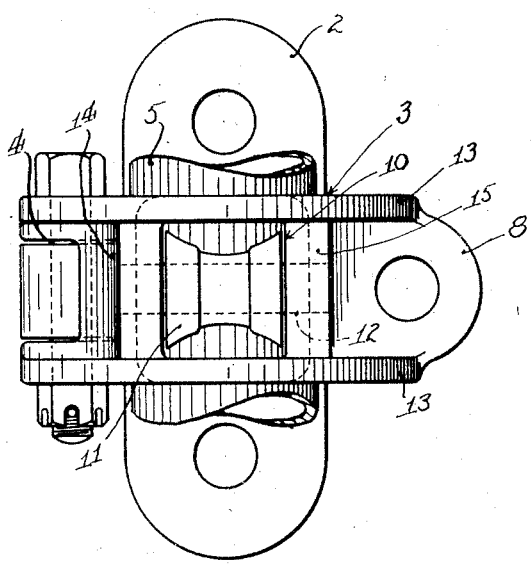
INVENTORS
Austin D. Williams,
Frank B. Gillett,
Russell P. Clark
by Booth & Booth
ATTORNEYS Patented Nov. 12, 1929

1,735,192

UNITED STATES PATENT OFFICE

AUSTIN D. WILLIAMS, FRANK B. GILLETT, AND RUSSELL P. CLARK, OF SACRAMENTO, CALIFORNIA

SUPPORT FOR PIPES, RODS, AND THE LIKE

Application filed September 4, 1928. Serial No. 303,742.

Our invention relates to supports for pipes, rods and the like in which provision is made for longitudinal movement of the supported pipe or rod.

Although our invention is applicable as a support for any pipe, rod, or similar object which has or may have longitudinal movement, it has been designed primarily as a support for the steam pipes ordinarily carried upon the outside of locomotive boilers. Such pipes are subject to expansion and contraction caused by changes in temperature, and unless allowance is made for such expansion and contraction, the pipe and its fittings are subject to breakage. At the same time, due to the vibration of the locomotive when in motion, the pipe must be firmly supported.

The principal object of our invention is to provide a support of the character described which will hold the supported pipe or rod firmly against lateral movement and yet allow it endwise movement. Other objects are to provide means for quickly and easily removing the pipe or rod from the support, to facilitate repairs, and to provide a structure which is cheap to manufacture and simple to install.

Still further objects and advantages of our invention will become apparent from the following specification, which should be read with the understanding that the form, construction, and arrangement of the several parts may be varied, within the limits of the claims hereto appended, without departing from the spirit of the invention as set forth therein.

Our invention will now be fully described with reference to the accompanying drawings, wherein:—

Fig. 1 is an end elevation of our support, showing a pipe in position therein.

Fig. 2 is a side elevation of the same.

Fig. 3 is a top or plan view, certain parts being omitted.

In the drawings, the reference numeral 1 designates a standard or post, which forms the body of our support, and which is provided with a base flange 2 by which it may be secured to any fixed object, such as the shell of a locomotive boiler (not shown). The upper or outer end of said body is forked, and a cap member 3 is secured, by a pivotal connection 4, to one arm of said forked outer end. The cap and the forked end of the body provide a substantially circular space, through which may pass the pipe or rod to be supported (shown in the drawings as a pipe 5).

At the side opposite to the hinge 4, the cap and body are connected by a bolt 6 and nut 7, said bolt extending freely through lugs 8 formed upon the cap and body. The bolt is provided with a cushioning spring 9, so that, by screwing up on the nut, the cap is clamped down upon the pipe 5 with yielding pressure.

The outer end of the body 1 and the tap 3 are each provided with sockets 10, in which are mounted rollers 11 journaled upon pins 12. These rollers, which are preferably formed with arcuate flanges, as shown, bear upon opposite sides of the pipe 5. It will be seen that, when the nut 8 is screwed up to compress the spring 9, the pipe is firmly clamped and guided between the rollers 11 so that it cannot move laterally, yet it is permitted to have endwise movement with very little friction. Thus any endwise movement of the pipe, due to expansion and contraction, or to other causes, is allowed to take place without strain, and at the same time objectionable lateral vibratory movement or rattling is effectively prevented.

It will also be appreciated by those skilled in the art that our device is simple and inexpensive to manufacture, since but little machining is required, and is easy to install. Moreover, because of the described connection between the cap and the body, the removal and replacement of the pipe, for repair or any other purpose, can be done very simply and quickly.

We consider it preferable, for structural considerations, to form the cap 3 and the forked end of the body 1 with reinforcing side flanges 13, connected by webs 14. These webs are continued horizontally into the lugs 8, and vertically to form bosses 15 for the reception of the roller pins 12. This construction is both strong and light, and provides free access for assembling the rollers 11 and their pins.

We claim:—

1. A support for longitudinally movable pipes, rods and the like comprising complementary body and cap members for embracing the supported object; a hinge connecting said members at one side; a bolt connecting said members at the other side; a spring associated with said bolt and forming therewith a resilient connection between said members; and rollers carried by said members and adapted to bear against the supported object.

2. A support for longitudinally movable pipes, rods and the like comprising complementary body and cap members formed with side flanges connected by a web, said web being turned outwardly to form spaced bosses; rollers mounted between said bosses and adapted to bear against the supported object; a hinge connecting said members at one side; and a separable connection between said members at the other side.

In testimony whereof we have signed our names to this specification.

AUSTIN D. WILLIAMS.
FRANK B. GILLETT.
RUSSELL P. CLARK.